(12) United States Patent
McCoy et al.

(10) Patent No.: US 8,459,137 B1
(45) Date of Patent: Jun. 11, 2013

(54) CONTROL ASSEMBLY FOR DRIVE SYSTEM

(75) Inventors: Kenneth Michael McCoy, Sullivan, IL (US); Nathan W. Bonny, Shelbyville, IL (US); Michael L. Bennett, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 252 days.

(21) Appl. No.: 13/082,273

(22) Filed: Apr. 7, 2011

Related U.S. Application Data

(60) Provisional application No. 61/321,645, filed on Apr. 7, 2010.

(51) Int. Cl.
*B60K 20/00* (2006.01)

(52) U.S. Cl.
USPC .............. 74/473.29; 74/473.1; 74/473.14

(58) Field of Classification Search
USPC ............ 74/473.29, 473.1, 473.14, 471 R, 74/470, 469
See application file for complete search history.

(56) References Cited

U.S. PATENT DOCUMENTS

| | | | |
|---|---|---|---|
| 3,006,128 A | 10/1961 | Weiland | |
| 3,792,744 A | 2/1974 | Gray | |
| 4,082,139 A | 4/1978 | Davis | |
| 4,399,895 A | 8/1983 | Kubo et al. | |
| 4,584,511 A | 4/1986 | Rudich, Jr. et al. | |
| 5,044,478 A * | 9/1991 | Kaesgen et al. | 192/220.1 |
| 5,107,566 A | 4/1992 | Schmid | |
| 5,211,267 A | 5/1993 | Clark | |
| 5,243,935 A | 9/1993 | Kano et al. | |
| 5,460,252 A | 10/1995 | Kosugi et al. | |
| 5,622,245 A | 4/1997 | Reik et al. | |
| 5,720,370 A | 2/1998 | Takahashi | |
| 5,836,159 A * | 11/1998 | Shimizu et al. | 60/487 |
| 5,944,152 A | 8/1999 | Lindsay et al. | |
| 6,167,999 B1 | 1/2001 | Reik et al. | |
| 6,234,288 B1 | 5/2001 | Reik et al. | |
| 6,722,638 B2 | 4/2004 | Kojima et al. | |
| 6,782,797 B1 | 8/2004 | Brandenburg et al. | |
| 6,968,686 B2 | 11/2005 | Okada et al. | |

(Continued)

FOREIGN PATENT DOCUMENTS

| | | |
|---|---|---|
| EP | 1001194 A2 | 5/2000 |
| JP | 05-147449 | 6/1993 |

OTHER PUBLICATIONS

Ace Controls Inc., Bi-Directional Damper, DT—47A & 57A Series, Ace Controls, Inc. 2007 Catalog, p. 9.

*Primary Examiner* — David M Fenstermacher
(74) *Attorney, Agent, or Firm* — Neal, Gerber & Eisenberg LLP

(57) ABSTRACT

An integrated assembly useful for controlling a variable speed drive having a housing and a control shaft projecting therefrom. The control assembly consists of a control arm fixed on the control shaft to effect its rotation; a return to neutral mechanism disposed about the control shaft to bias the control shaft to a neutral position; and a rotary, viscous fluid damper integrated with the return to neutral mechanism, the damper having a rotor engaged to the control shaft and a stator fixed to the housing of the variable speed drive to moderate, or slow the rotational movement of the control shaft under the influence of inputs from the control arm and the return to neutral mechanism. The neutral arm of the return to neutral mechanism is integrally formed with the external case of the rotary, viscous fluid damper, creating a compact control mechanism.

21 Claims, 4 Drawing Sheets

U.S. PATENT DOCUMENTS

| | | |
|---|---|---|
| 7,134,276 B1 | 11/2006 | Langenfeld |
| 7,197,873 B1 * | 4/2007 | Windhorst et al. ............. 60/487 |
| 7,313,915 B1 | 1/2008 | Windhorst et al. |
| 7,669,397 B1 | 3/2010 | Goman et al. |
| 7,695,017 B2 | 4/2010 | Harris et al. |
| 7,950,366 B2 * | 5/2011 | Arai et al. .................... 123/376 |
| 8,057,335 B1 * | 11/2011 | Langenfeld .................. 474/139 |
| 8,100,204 B2 * | 1/2012 | Dong et al. ................. 180/6.48 |
| 8,205,539 B2 * | 6/2012 | Kisse et al. .................... 92/12.2 |
| 2001/0017247 A1 | 8/2001 | Machida |
| 2004/0099494 A1 | 5/2004 | Hadden et al. |
| 2005/0006189 A1 | 1/2005 | Kanno et al. |
| 2005/0077130 A1 | 4/2005 | Hayashi et al. |
| 2006/0011428 A1 | 1/2006 | Hayashi et al. |
| 2006/0070833 A1 | 4/2006 | Kanno et al. |
| 2006/0070834 A1 | 4/2006 | Kanno et al. |
| 2006/0070835 A1 | 4/2006 | Kanno et al. |
| 2006/0113154 A1 | 6/2006 | Hayashi et al. |
| 2006/0207844 A1 | 9/2006 | Koizumi et al. |
| 2007/0045982 A1 | 3/2007 | Tomonaga |
| 2007/0102250 A1 | 5/2007 | Hayashi et al. |
| 2007/0137402 A1 | 6/2007 | Mototani et al. |
| 2007/0187972 A1 | 8/2007 | Takatsura et al. |
| 2007/0257461 A1 | 11/2007 | Lutz |
| 2008/0202873 A1 | 8/2008 | Hayashi et al. |
| 2008/0302619 A1 | 12/2008 | Cultraro |
| 2009/0096246 A1 | 4/2009 | Patzer et al. |
| 2009/0277735 A1 | 11/2009 | Yamaguchi et al. |
| 2010/0072009 A1 | 3/2010 | Yamazaki et al. |

* cited by examiner

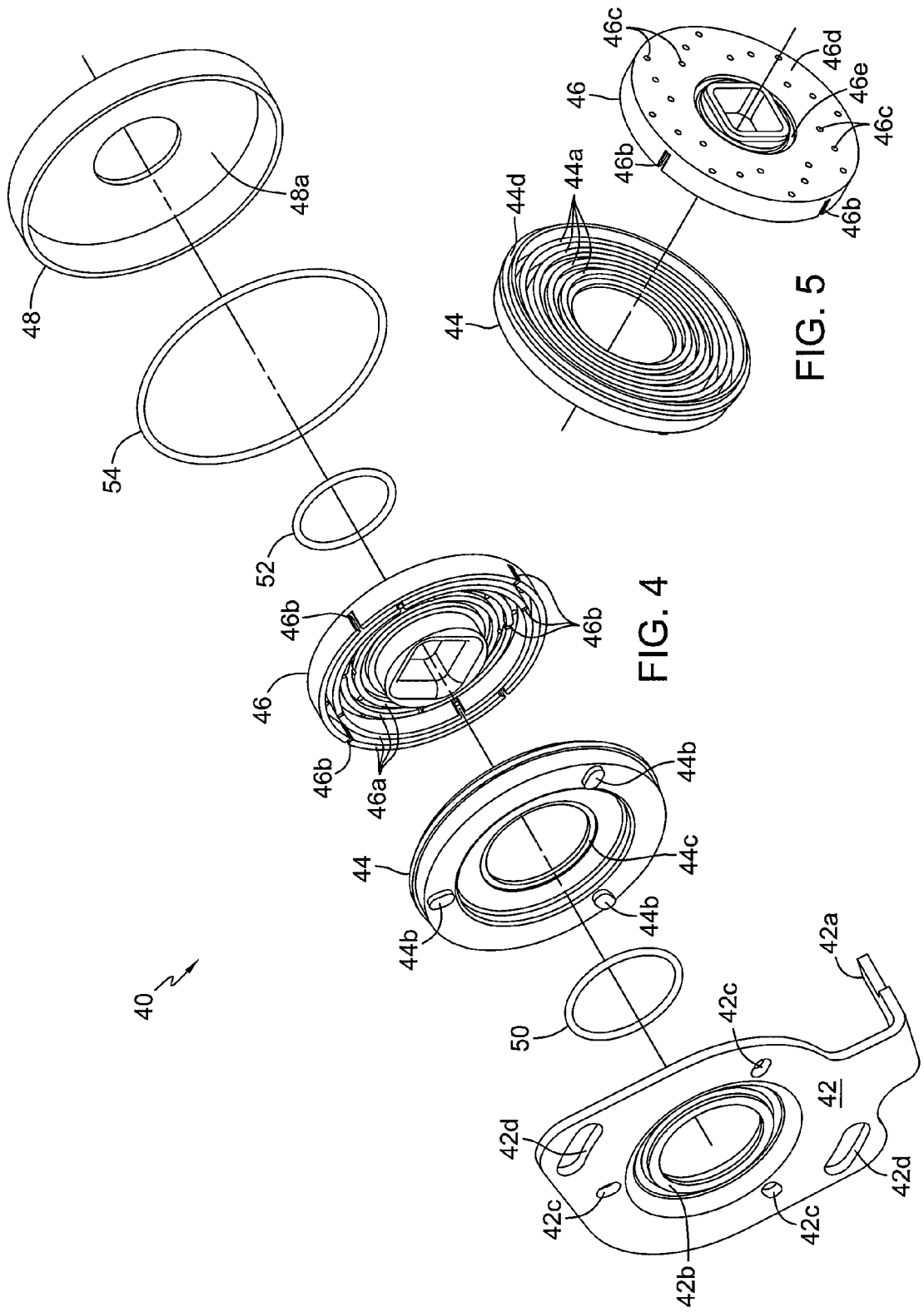

CONTROL ASSEMBLY FOR DRIVE SYSTEM

CROSS REFERENCE

This application claims the benefit of U.S. Provisional Patent Application Ser. No. 61/321,645 filed on Apr. 7, 2010, the contents of which are incorporated herein by reference.

FIELD OF THE INVENTION

This invention relates to control assemblies for drive systems used in self-propelled vehicles and machines. The invention is particularly useful for controlling a pump/motor combination, transmission, or transaxle used in self-propelled vehicles and machines such as riding lawn mowers, snow-throwers, and lawn or garden tractors.

BACKGROUND OF THE INVENTION

Self-propelled vehicles and machines such as riding lawn mowers, snow-throwers, and lawn or garden tractors using variable speed drives are well known. Such variable speed drives, whether hydrostatic, toroidal, friction, or the like, will generally have a control shaft whose rotation, via manipulation of an operator control mechanism mechanically linked to the control shaft, regulates the variable speed drive's output. As an example, many zero-turn mowers employ a pair of pumps which independently transmit hydraulic fluid, and thus power, to a corresponding pair of hydraulic motors, each independently driving a separate axle and wheel combination to provide steering. The control mechanism utilized by an operator of the machine often employs a damper to prevent sudden acceleration or deceleration of the machine resulting from unintended manipulation of the control mechanism, for example, when the operator is jostled upon striking a bump, dip, or other obstacle in the machine's path. Dampers may be used between the operator control levers and the frame or body of the zero-turn mower, using mounting points on the mower's body or frame distant from the variable speed drive system. Dampers may also be connected directly to a control arm, the mechanical link between the control shaft of the pump and the operator control mechanism. Again, additional mounting points are necessary to effectuate the damping effect.

It would be advantageous for manufacturers of self-propelled vehicles and machines to eliminate bulky dampers and their associated mounting points, reducing manufacturing costs and assembly complexity, while retaining the functional benefits of the dampers.

SUMMARY OF THE INVENTION

This invention relates to an assembly useful for controlling a variable speed drive having a control shaft projecting from its housing. The reference to a variable speed drive as used herein will be understood to include, at a minimum, pumps, transmissions and transaxles, whether hydrostatic, toroidal, friction or the like. The control assembly comprises a control arm fixed on the control shaft to effect rotation thereof; a return to neutral mechanism disposed about the control shaft to bias the control shaft to a neutral position; and a rotary, viscous fluid damper integrated with the return to neutral mechanism, the damper having a rotor engaged to the control shaft and a stator fixed to the housing of the variable speed drive to moderate, or slow the rotational movement of the control shaft under the influence of inputs from the control arm and the return to neutral mechanism. The neutral arm of the return to neutral mechanism may be integrally formed with the external case of the rotary, viscous fluid damper, creating a compact control mechanism. The inclusion of the damper mechanism in the control assembly makes it unnecessary for a manufacturer to supply a separate dampening mechanism in the control linkage of a vehicle or machine employing such a variable speed drive. This invention also relates to a variable speed drive fitted with the control assembly.

A better understanding of the objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

FIG. 4 is an exploded perspective view of the rotary damper subassembly shown in FIGS. 1 and 3.

FIG. 5 is an exploded perspective view showing the reverse sides of elements of the rotary damper subassembly shown in FIG. 4.

DETAILED DESCRIPTION OF THE INVENTION

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claim, either literally or under the doctrine of equivalents.

Figure 1:
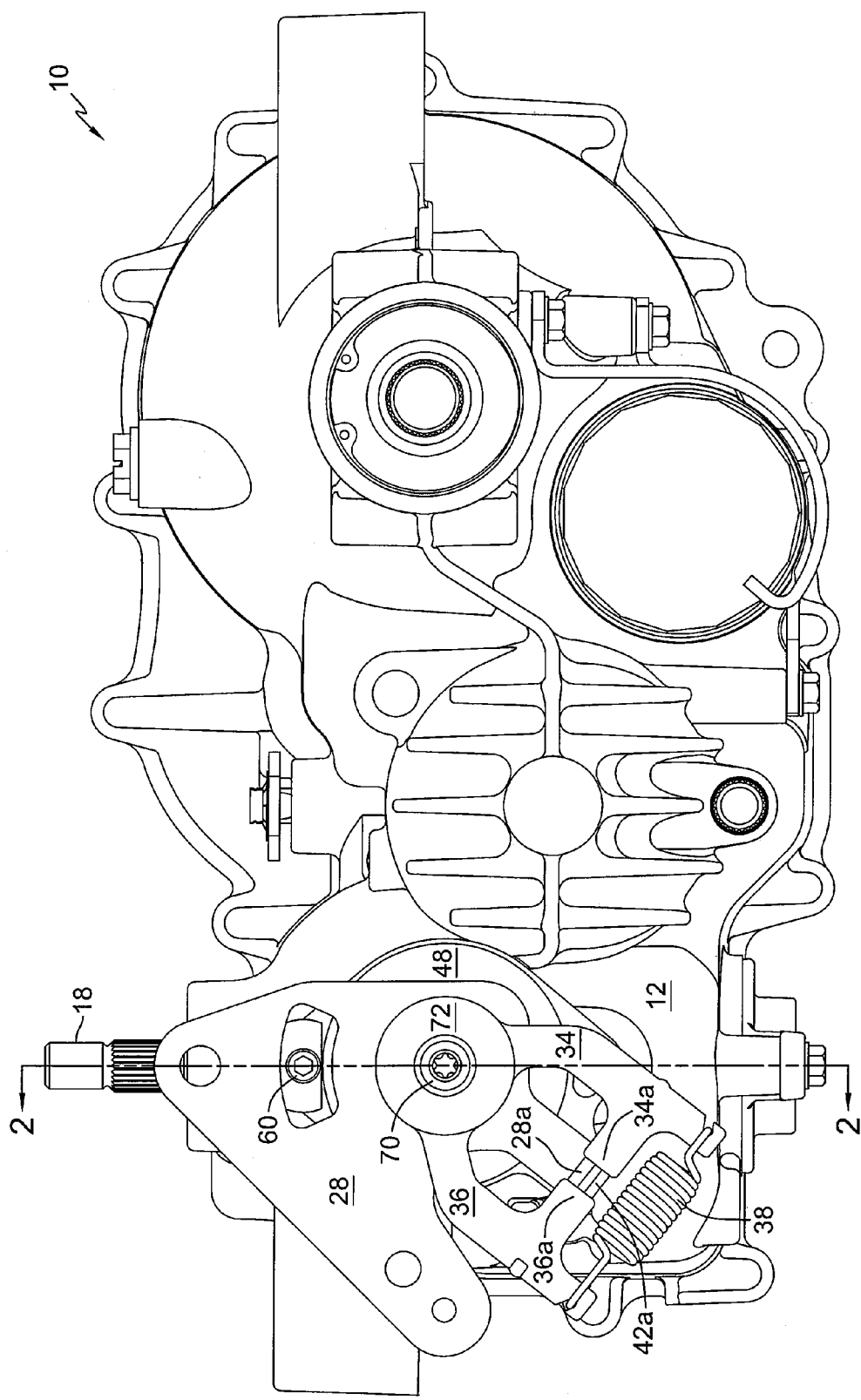
FIG. 1 is a side elevation view of an exemplary transaxle incorporating the control assembly in accordance with one embodiment of the invention.
Figure 2:
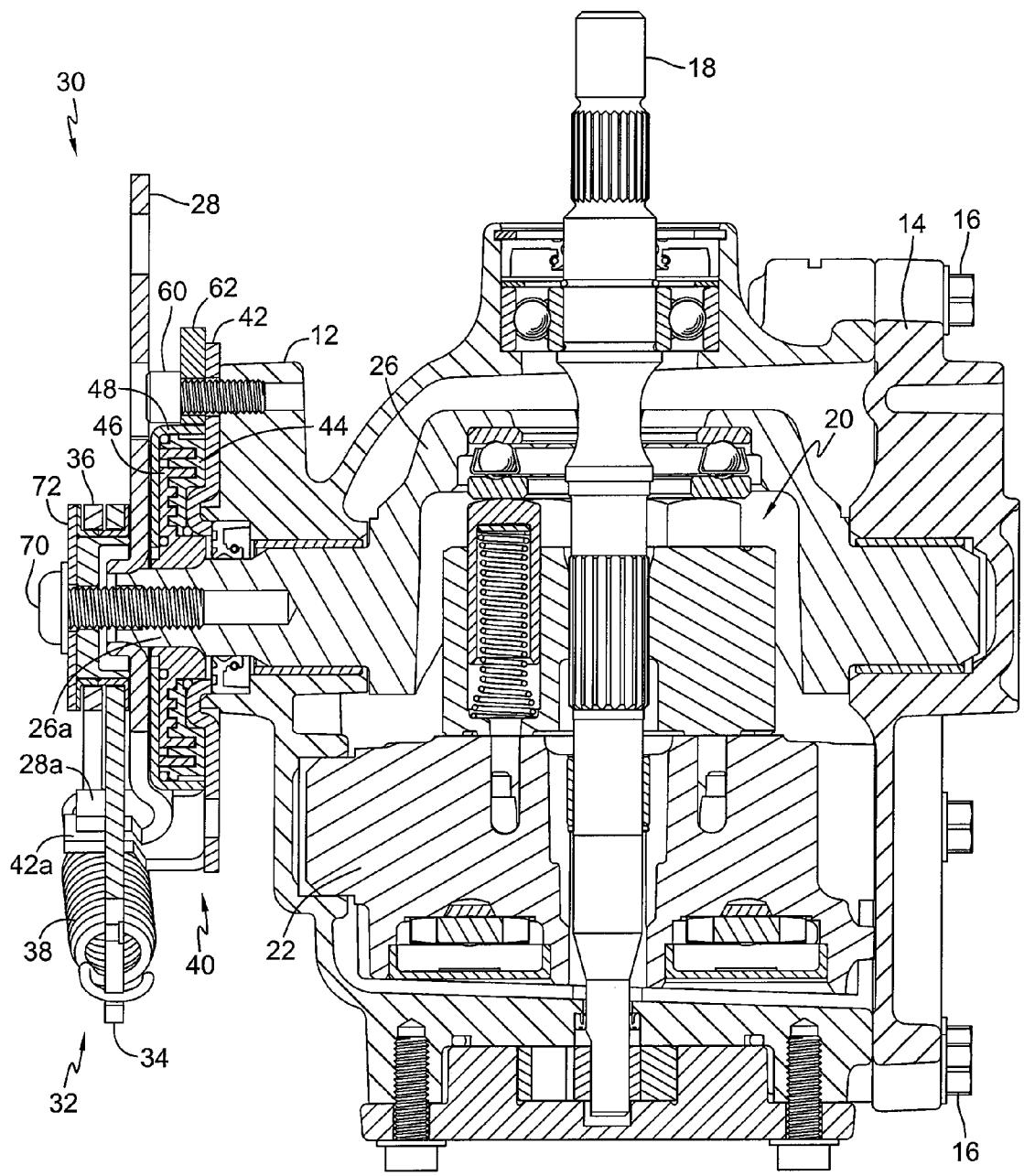
FIG. 2 is a cross-section of the transaxle of FIG. 1 taken along line 2-2.

Turning now to the figures, wherein like reference numerals refer to like elements, an embodiment of a control assembly 30 of the present invention is depicted in FIGS. 1 and 2 as used in connection with a transaxle 10, which may be substantially identical to that described in commonly owned U.S. Pat. No. 7,134,276, the disclosure of which is incorporated herein by reference. The details of transaxle 10 are not critical to this invention; this invention could also be used on other transaxle, transmission, or even pump designs and this disclosure should not be read as limited to use with a zero-turn transaxle such as transaxle 10. The variable speed drive may comprise a hydrostatic or hydraulic pump in a housing or a mechanical mechanism such as a toroidal drive, so long as there is a control shaft to regulate the output of the variable speed drive and extending from the housing of the variable speed drive. The return to neutral design depicted herein is bi-directional in function and similar in many respects to that shown in commonly owned U.S. Pat. No. 7,313,915. The return to neutral design depicted herein is also similar to the bi-directional and uni-directional designs disclosed in commonly owned U.S. Pat. No. 6,782,797. It will be understood that the control assembly of the present invention may be used in connection with other return to neutral designs and that this invention is not so limited. For further details on the operation of transaxle 10 or the return to neutral feature, the reader is referred to the patents referenced above, which are incorporated by reference herein in their entirety.

The element of transaxle 10 upon which the control assembly 30 acts is a control shaft, in this instance, trunnion shaft 26a which extends from main housing 12. Though trunnion shaft 26a is depicted in FIG. 2 as integral with movable swash plate 26, it will be understood that the trunnion shaft may be a separable element from the swash plate. The general design of a hydrostatic transmission, such as transaxle 10, is well known in the art and generally includes a variable displacement, axial piston pump 20 and a fixed displacement, axial piston motor (not shown), each carrying a plurality of reciprocating pistons which are placed in fluid communication through hydraulic porting located in a center section 22. When swash plate 26 is rotated away from a neutral position, the rotation of pump 20 against moveable swash plate 26 creates an axial motion in the pump pistons that forces an operating oil through the hydraulic porting to the axial piston motor, displacing the motor pistons and causing rotation of the motor to drive an output shaft or axle. The flow of operating oil from pump 20 may be reversed by changing the direction of rotation of swash plate 26 away from the neutral position, thereby reversing the direction of rotation of the motor output shaft or axle. The axial piston pump 20 is driven by an input shaft 18, which is generally powered by a prime mover (not shown) such as an internal combustion engine or electric motor. Side housing 14 is secured to main housing 12 by a plurality of fasteners 16, forming a sump for the operating oil. In an alternate transaxle embodiment (not shown), wherein the trunnion shaft extends from the side housing, control assembly 30 may be disposed about the trunnion shaft adjacent the side housing.

Figure 3:
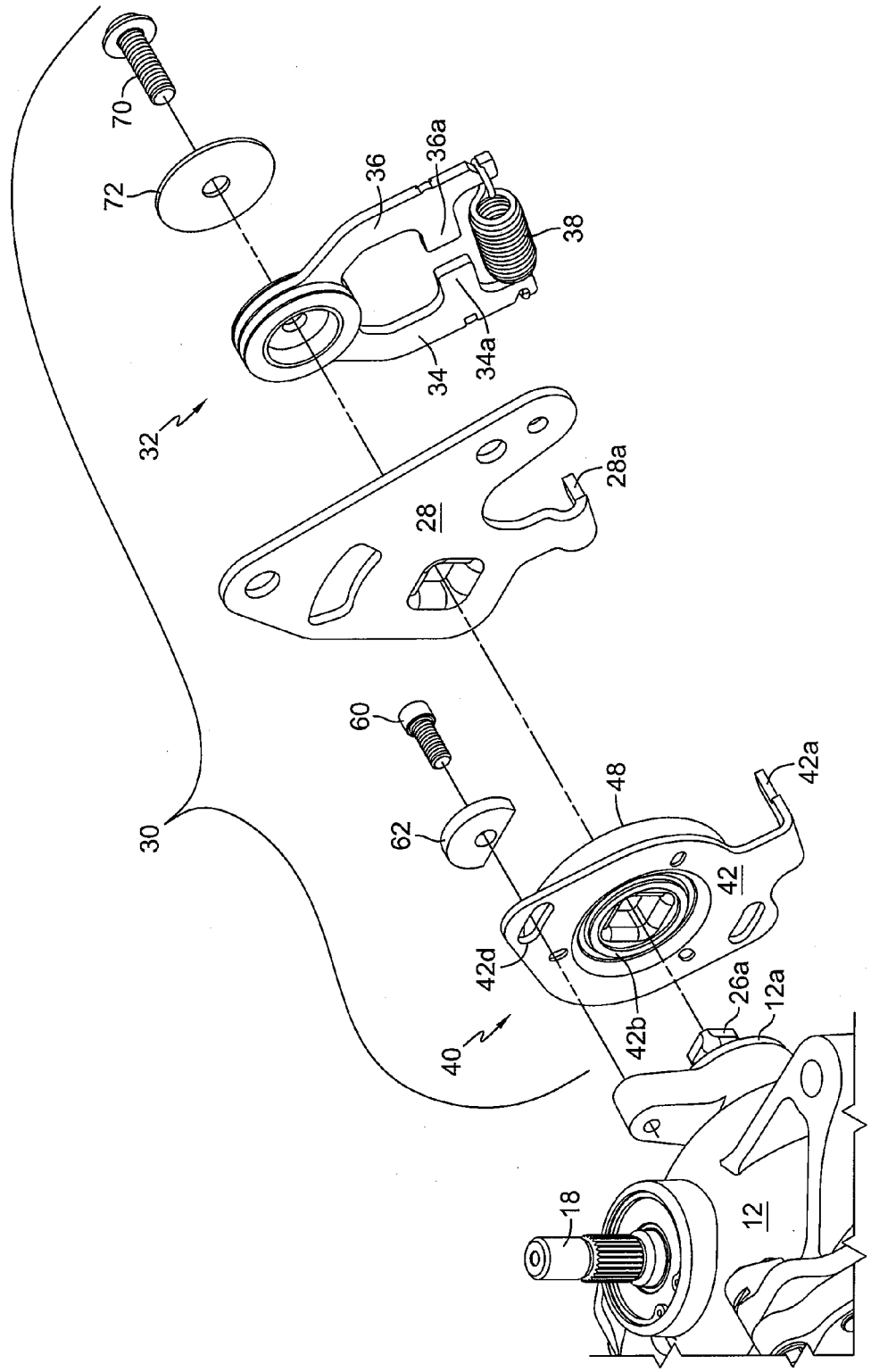
FIG. 3 is a partially exploded perspective view of the control assembly shown in FIG. 1.

In general terms, control assembly 30 consists of a rotary damper subassembly 40, a control arm 28, and a scissor arm style, return to neutral subassembly 32. Rotary damper subassembly 40 has a backing plate 42 as part of its external case, wherein certain cooperative elements of the return to neutral subassembly are integrally formed therewith. Specifically, a neutral arm extension 42a radially disposed from the trunnion shaft 26a and a pair of openings 42d. As shown in FIG. 3, proper placement of control assembly 30 is assured by the mating of a centering ring 12a formed on main housing 12 with the centering flange 42b formed in the backing plate 42 of rotary damper subassembly 40. Screw 70 and washer 72 retain the various elements of control assembly 30 on trunnion shaft 26a, though other means known in the art may be used to connect such elements.

Control arm 28 is fixed to the end of trunnion shaft 26a, preferably by providing control arm 28, trunnion shaft 26a and the center opening of a damper rotor 46 (as shown in FIG. 4) with complementary mating shapes, so that rotation of control arm 28 will also result in rotation of trunnion shaft 26a and damper rotor 46. Control arm 28 may be connected, via a driving link, to a lever or pedal (not shown) provided on the vehicle (not shown) whereby movement of the lever or pedal is translated to the speed adjusting mechanism 30 to cause the rotation of trunnion shaft 26a and movement of swash plate 26.

As shown in FIGS. 1, 2, and 3, return to neutral subassembly 32 of control assembly 30 is of the scissors-arm style, comprising an inner scissors return arm 34 and an outer scissors return arm 36 rotatably disposed at the end of trunnion shaft 26a. A biasing means such as spring 38 is linked to inner and outer scissors return arms 34 and 36.

Control assembly 30 also functions to substantially establish the neutral position of trunnion shaft 26a, i.e., the position of trunnion shaft 26a where swash plate 26 does not cause flow of hydraulic fluid within the hydraulic circuit of a hydrostatic transmission such as that depicted. During the mating of control assembly 30 to transaxle 10, trunnion shaft 26a and the attached control arm 28 are rotated to the position that corresponds to the neutral position of swash plate 26. The neutral arm extension 42a of rotary damper backing plate 42 is rotated into radial alignment with a similar control arm extension 28a integrally formed on control arm 28 to demarcate the neutral position. Neutral arm extension 42a may be locked into this neutral position by means of a neutral set screw 60 and lockdown washer 62 combination, or the like, inserted through opening 42d to mate with a boss on main housing 12. Two openings 42d are provided to permit the control assembly 30 to be rotated 180 degrees to allow for various mating orientations with external operating linkages. The configuration and operation of the return to neutral subassembly 32, via the interaction of the contact surfaces 34a and 36a of the inner scissor return arm 34 and the outer scissor return arm 36, respectively, with the neutral arm extension 42a and control arm extension 28a, is otherwise conventional as described in U.S. Pat. No. 7,313,915 and will not be recited herein.

Because control assemblies such as control assembly 30 comprise a plurality of components, it is advantageous to preassemble a portion of them in order to simplify assembly and reduce costs. Rotary damper subassembly 40, shown in FIGS. 3, 4 and 5 as part of control assembly 30, serves to dampen the movement of trunnion shaft 26a and, thus, make changes in the position of swash plate 26 less abrupt than they would otherwise be. This dampening substantially decreases unwanted and unintentional jarring movements of the trunnion shaft 26a due to passage of a self-propelled vehicle or machine so equipped over rough terrain, thereby providing smoother control of the pump 20 and thus, smoother control of the associated motor output. This dampening also prevents sudden reversal of the motor and reduces bucking of the vehicle or machine, similarly reducing the risk of damage to the hydraulic equipment. Though the control assembly and its benefits are described in conjunction with a hydrostatic transaxle, the control assembly of the present invention will impart similar benefits to any variable speed drive having a control shaft extending from its housing.

Rotary damper subassembly 40 comprises a viscous fluid damper formed of damper backing plate 42, o-ring seal 50, damper stator 44, damper rotor 46, o-ring seals 52 and 54, and damper cover 48. On a first side, damper stator 44 has anti-rotation projections 44b that mate with and project through openings 42c on damper backing plate 42 to prevent rotation of damper stator 44, and a seat 44c for o-ring seal 50. On a second side opposite the first side, damper stator 44 has concentric friction rings 44a projecting therefrom and a seat 44d for o-ring seal 54. Concentric friction rings 44a mesh with concentric friction rings 46a of damper rotor 46 in an environment of viscous fluid to produce the dampening effect. Concentric friction rings 46a of damper rotor 46 additionally have slots 46b therein to allow passage of a viscous fluid therethough. Damper rotor 46 also has fluid openings 46c in rotor face 46d which allow passage of viscous fluid therethrough, serving to provide additional damping surface area and lubrication between rotor face 46d and the inside face 48a of damper cover 48 when damper rotor 46 rotates due to manipulation of control arm 28. The viscous fluid that fills the void space in the rotary, viscous fluid damper can be a grease such as "PTFE-thickened damping grease" or a "Fluorocarbon Gel," each available from Nye Lubricants, Fairhaven, Mass., USA. It will be apparent to one of ordinary skill that the viscosity of the viscous fluid can be varied to obtain the desired dampening effect from the rotary, viscous fluid damper. Damper cover 48 is secured to damper backing plate 42, e.g. by friction fit of guide indentations or the like (not shown) on the rim of the cover, or by crimping features such as tabs and slots (not shown) to secure the parts of the rotary damper subassembly 40.

Inner scissors return arm 34 and outer scissors return arm 36 may also be pre-assembled to form bi-directional scissors return subassembly 32, as shown in FIG. 3. The use of these separate subassemblies simplifies the assembly of the entire control assembly and the transaxle.

While specific embodiments have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A control assembly for a variable speed drive having a control shaft projecting from a housing, the control assembly comprising:
    a damper comprising a case fastened to the housing and a rotatable dampening element disposed in the case and rotatably engaged to the control shaft;
    a neutral arm disposed on the case and having a first extension radially positioned about the control shaft;
    a control arm fixed to the control shaft, wherein the control arm comprises a second extension radially positioned about the control shaft;
    a pair of scissor return arms rotatably disposed about the control shaft, wherein each scissor return arm is adapted to selectively engage the first extension and the second extension; and
    a return spring engaged to the pair of scissor return arms, wherein the return spring acts through the pair of scissor return arms to rotate the control arm and bring the second extension into radial alignment with the first extension.

2. The control assembly of claim 1, wherein a first rotational position of the control arm, in which the first extension and the second extension are in radial alignment, establishes a neutral position for the control shaft.

3. The control assembly of claim 1, wherein the damper moderates rotational movement of the control shaft.

4. The control assembly of claim 2, wherein the damper and the return spring cooperate to resist movement of the control arm away from the first rotational position to a second rotational position.

5. The control assembly of claim 4, wherein the damper resists movement and the return spring produces movement of the control arm from the second rotational position to the first rotational position.

6. The control assembly of claim 1, wherein the damper is a rotary viscous fluid damper.

7. The control assembly of claim 1, wherein the rotatable dampening element comprises a rotor element engaged to the control shaft and comprising a first set of concentric projections, and the damper further comprises a stator element comprising a plurality of anti-rotation projections that engage the case and a second set of concentric projections that mesh with the first set of concentric projections.

8. The control assembly of claim 7, further comprising a viscous PTFE-thickened damping grease disposed in the damper.

9. The control assembly of claim 7, wherein the rotor element further comprises a face and a plurality of openings formed in the face to permit a viscous fluid to pass through the plurality of openings to occupy a space between the face and the case.

10. The control assembly of claim 7, wherein the rotor element further comprises a plurality of slots in the first set of concentric projections.

11. A control assembly for a variable speed drive, wherein the variable speed drive has a control shaft projecting from a housing and rotatable between a neutral position and a plurality of non-neutral positions, the control assembly comprising:
    a control arm fixed to the control shaft, wherein the control arm selectively rotates the control shaft between the neutral position and the plurality of non-neutral positions;
    a return to neutral mechanism engaged to the control shaft to rotate the control shaft from one of the plurality of non-neutral positions to the neutral position; and
    a rotary damper engaged to the control shaft, wherein the rotary damper comprises a case fastened to the housing, wherein a structural component of the return to neutral mechanism is formed with the case.

12. The control assembly of claim 11, wherein the structural component of the return to neutral mechanism comprises a neutral arm.

13. The control assembly of claim 12, wherein the return to neutral mechanism further comprises a scissor return arm assembly rotatably disposed about an end of the control shaft, and wherein the scissor return arm assembly cooperates with the neutral arm to rotate the control arm and move the control shaft into the neutral position.

14. The control assembly of claim 12, wherein the case is fastened to the housing in a radial orientation about the control shaft that places the neutral arm in the neutral position.

15. A variable drive device, comprising:
    a variable speed transmission disposed in a housing and comprising a control shaft rotatably disposed in and extending from the housing, wherein rotation of the control shaft moves the variable speed transmission between a neutral position and a plurality of drive positions;
    a control arm disposed external to the housing and engaged to the control shaft to move the variable speed transmission among the neutral position and the plurality of drive positions;
    a plate having a first surface and second surface opposite the first surface, wherein at least a portion of the first surface is secured to an external surface of the housing so that the plate does not rotate with respect to the housing, wherein the control shaft extends through an opening in the plate without engaging the plate;
    a stator fixed to the second surface of the plate in a non-rotatable manner, wherein the control shaft extends through an opening in the stator without engaging the stator, the stator further comprising a first dampening mechanism formed thereon;
    a rotor fixed to and rotatable with the control shaft, the rotor comprising a second dampening mechanism engaged to the first dampening mechanism; and a return to neutral mechanism engaged to the control shaft to provide a return force to return the control shaft to the neutral position when the control shaft is moved to one of the plurality of drive positions.

16. The variable drive device of claim 15, wherein the first dampening mechanism comprises a first plurality of frictional rings and the second dampening mechanism comprises a second plurality of frictional rings.

17. The variable drive device of claim 15, wherein the variable speed transmission comprises a hydraulic pump disposed in the housing and driven by a rotatable input shaft and a swash plate disposed in the housing and movable between the neutral position and the plurality of drive positions to vary the output of the hydraulic pump, and wherein the control shaft comprises a trunnion shaft engaged to the swash plate.

18. The variable drive device of claim 17, wherein the trunnion shaft is integrally formed as part of the swash plate.

19. The variable drive device of claim 15, wherein the return to neutral mechanism comprises a neutral arm integrally formed with the plate.

20. The variable drive device of claim 19, wherein the return to neutral mechanism further comprises a scissor return arm assembly rotatably disposed on the control shaft, and the scissor return arm assembly cooperates with the neutral arm to rotate the control arm and move the variable speed transmission into the neutral position.

21. The variable drive device of claim 15, wherein the plurality of drive positions comprises a plurality of forward positions and a plurality of reverse positions.

* * * * *